United States Patent
Holt (10) Patent No.: US 12,523,321 B2
(45) Date of Patent: Jan. 13, 2026

(54) RISER AND INGRESS DEVICE ASSEMBLY FOR SEPTIC TANK SYSTEM

(71) Applicant: Aero-Stream LLC, Hartland, WI (US)

(72) Inventor: Karl Kevin Holt, Steamboat Springs, CO (US)

(73) Assignee: Aero-Stream LLC, Hartland, WI (US)

( * ) Notice: Subject to any disclaimer, the term of this patent is extended or adjusted under 35 U.S.C. 154(b) by 369 days.

(21) Appl. No.: 17/714,801

(22) Filed: Apr. 6, 2022

(65) Prior Publication Data
US 2022/0316634 A1 Oct. 6, 2022

Related U.S. Application Data

(60) Provisional application No. 63/200,964, filed on Apr. 6, 2021.

(51) Int. Cl.
| | |
|---|---|
| *F16L 23/16* | (2006.01) |
| *E02D 29/14* | (2006.01) |
| *E03F 5/02* | (2006.01) |
| *E03F 11/00* | (2006.01) |
| *F16L 15/04* | (2006.01) |

(52) U.S. Cl.
CPC .......... *F16L 23/16* (2013.01); *E02D 29/1409* (2013.01); *E03F 5/02* (2013.01); *E03F 11/00* (2013.01); *F16L 15/04* (2013.01)

(58) Field of Classification Search
CPC ... E03F 5/02; E03F 11/00; F16L 23/16; F16L 15/04; E02D 29/12; E02D 29/1409
USPC ...................................................... 52/19, 20
See application file for complete search history.

(56) References Cited

U.S. PATENT DOCUMENTS

| | | | | |
|---|---|---|---|---|
| 4,310,372 A | * | 1/1982 | Janssen | F16L 37/252 166/227 |
| 4,717,040 A | * | 1/1988 | Stanton | B65D 1/0238 220/266 |
| 5,655,564 A | * | 8/1997 | Gavin | F16L 5/10 52/21 |
| 5,852,901 A | * | 12/1998 | Meyers | E03F 5/02 220/4.26 |
| 7,225,587 B2 | * | 6/2007 | Shinehouse | E03F 11/00 52/21 |

(Continued)

OTHER PUBLICATIONS

Aero-Stream, Kevin Holt, "How to install septic tank risers—DIY and Save!", <https://www.youtube.com/watch?v=2byVRgPec40>, Oct. 2015, 3 pages.

*Primary Examiner* — Brian E Glessner
*Assistant Examiner* — Adam G Barlow
(74) *Attorney, Agent, or Firm* — Michael Best & Friedrich LLP (57) ABSTRACT

An ingress device assembly is configured to be used with a septic tank that has a chamber and an access opening and a riser extending from the chamber. The ingress device assembly includes a connector including a flange including a first section and a second section cooperatively defining a perimeter of the connector and an inner bore configured to align with the access opening, the first section having a first interlock feature and the second section having a second interlock feature engaged with the first interlock feature; and an ingress device removably and rotatably coupled to the connector, the ingress device including a body configured to extend across at least a portion of the access opening.

15 Claims, 10 Drawing Sheets

(56) References Cited

U.S. PATENT DOCUMENTS

| | | | | |
|---|---|---|---|---|
| 7,347,644 B2* | 3/2008 | Meyers | ............... | E02D 29/12 |
| | | | | 404/25 |
| 7,770,333 B2* | 8/2010 | Meyers | ............... | F16L 41/08 |
| | | | | 220/4.03 |
| 7,926,510 B1* | 4/2011 | Terry, III | ............ | E03F 11/00 |
| | | | | 405/133 |
| 7,966,786 B2* | 6/2011 | Koteskey | ........... | E02D 29/121 |
| | | | | 220/4.04 |
| 12,018,472 B1* | 6/2024 | Holbrook | ............ | E03F 5/105 |
| 2003/0145527 A1* | 8/2003 | Meyers | ............... | E02D 29/12 |
| | | | | 405/41 |
| 2007/0000184 A1* | 1/2007 | Koteskey | .......... | E02D 29/121 |
| | | | | 52/20 |
| 2010/0242377 A1* | 9/2010 | Koteskey | ............ | E02D 29/12 |
| | | | | 52/169.1 |
| 2013/0336723 A1* | 12/2013 | McKinney | ............ | E03F 5/02 |
| | | | | 405/129.55 |
| 2024/0191454 A1* | 6/2024 | Rood | ............... | E02D 29/1409 |
| 2024/0247476 A1* | 7/2024 | Cislo | ..................... | E03F 1/00 |
| 2024/0263725 A1* | 8/2024 | Lemmers, Jr. | ......... | F01D 25/00 |
| 2024/0271727 A1* | 8/2024 | Kilchyk | ............... | F16L 23/04 |

\* cited by examiner

FIG. 12B

RISER AND INGRESS DEVICE ASSEMBLY FOR SEPTIC TANK SYSTEM

BACKGROUND

The present invention relates to generally septic tank systems, water tank systems, storage tank systems, sewer wet well systems, wastewater treatment tank systems, and the like, and, more specifically, the present invention relates to a riser pipe assembly for one or more of these systems.

A septic tank system includes an underground septic tank that has a chamber for receiving and processing waste. It is often necessary to access the chamber of the septic tank to perform routine maintenance or empty the septic tank. Although some conventional devices can prevent accidental ingress into the septic tank, existing conventional devices (e.g., screens, lids, or nets) are designed to be installed at the top of the riser with visible fasteners. This location and attachment method provides an opportunity for tampering and for unauthorized personnel to access and remove the ingress device fasteners and the device itself. Also, conventional ingress devices using visible fasteners are susceptible to the possibility that the fasteners may not have been installed at origination or may not be reinstalled after being removed by service personnel. This could result in accidental ingress caused by easily defeating the ingress device, leading to a potentially dangerous situation.

SUMMARY OF THE INVENTION

The invention provides an adapter flange or connector and an ingress device connected thereto that inhibits accidental ingress into a septic tank. In some embodiments, the adapter flange is square-shaped, and in other embodiments, the adapter flange is circular. This device is intended to be installed at the access opening of the septic tank and interface with the riser pipe providing a tamper proof barrier for the prevention of accidental ingress. The ingress device may contain openings of any geometric shape including, but not limited to, triangles, squares or circles. Physically defeating the ingress device is made more difficult by locating it lower in the riser pipe and attaching with hidden fasteners.

To address the excessive cost to produce and ship, the relatively large flange, with the plurality of identical sections (e.g., four) that snap together in the field at assembly, makes it possible to reduce the shipping container size and cost.

The integrated ingress device is designed to allow inspection and cleaning activities on the septic tank to be performed without having to be removed. Clearance for pumping and inspection equipment to pass through into the septic tank has been designed into the ingress device openings.

In one aspect, the present invention provides an ingress device assembly with a chamber that has an access opening and a riser extending from the chamber. The ingress device assembly includes a connector including a flange including a first section and a second section cooperatively defining a perimeter of the connector and an inner bore configured to align with the access opening, the first section having a first interlock feature and the second section having a second interlock feature engaged with the first interlock feature; and an ingress device removably and rotatably coupled to the connector, the ingress device including a body configured to extend across at least a portion of the access opening.

In another aspect, the present invention provides a connector for use in a riser pipe. The connector includes a flange that defines a continuous perimeter and that includes a first surface, a first section defining a first interlock feature, and a second section defining a second interlock feature that is complementary to the first interlock feature such that the first and second sections are attached to each other by the first and second interlock features and cooperatively define the perimeter.

In another aspect, the present invention provides a riser pipe assembly including a first riser pipe, a connector attached to the first riser pipe and having a plurality of sections that are removably coupled to each other, a second riser pipe coupled to a side of the connector opposite the first riser pipe, and an ingress device removably coupled to the connector via rotation of the ingress device relative to the connector, the ingress device positioned within the second riser pipe and including an aperture extending therethrough.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
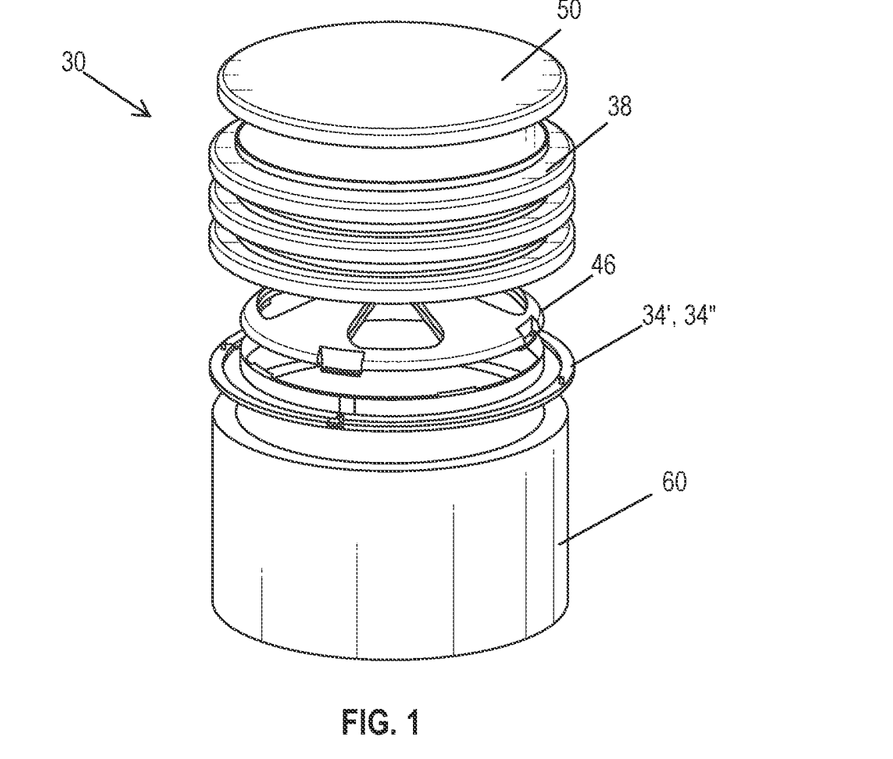
FIG. 1 is a perspective view of a septic tank and a riser according to an exemplary embodiment of the invention.
Figure 2A:
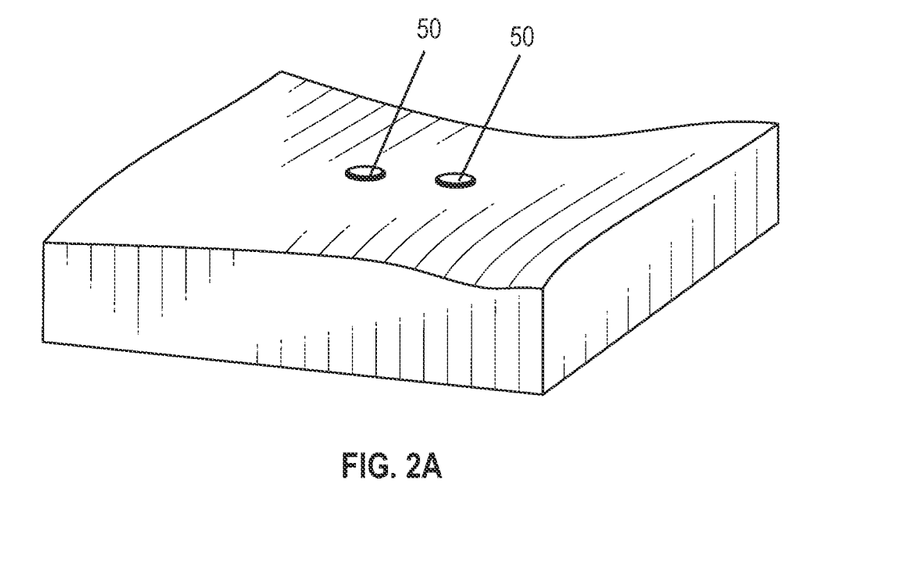
FIG. 2A is a schematic view of a portion of a riser assembly according to another embodiment.
Figure 2B:
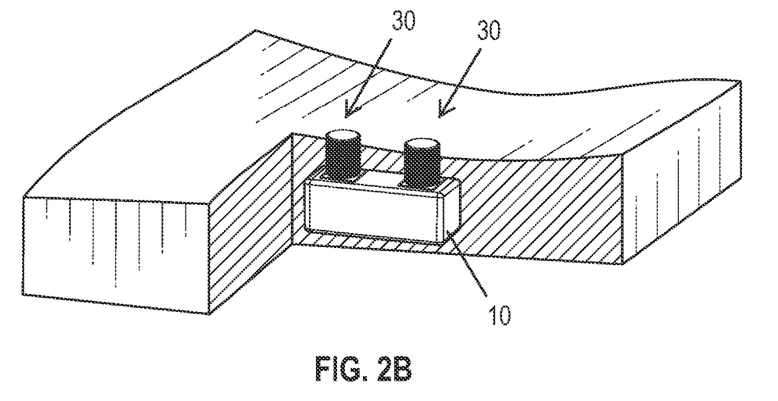
FIG. 2B is a schematic view of the riser of FIG. 2A relative to another septic tank.
Figure 2C:
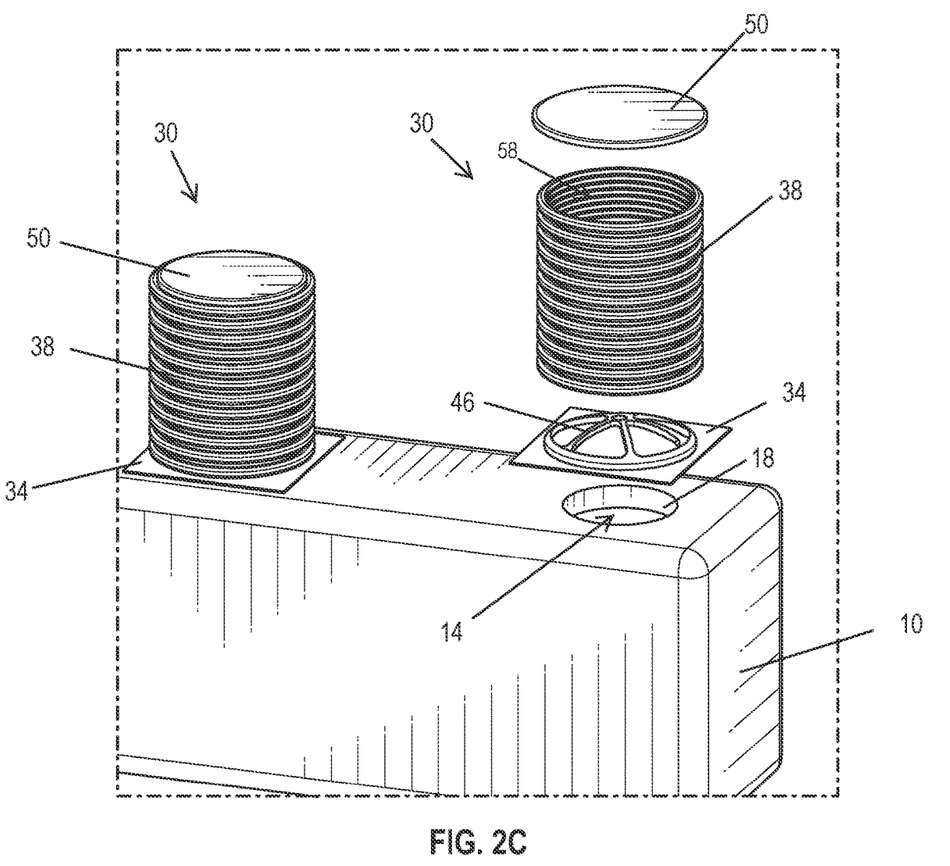
FIG. 2C is a schematic view of the riser of FIG. 2A relative to the septic tank of FIG. 2B.

FIGS. 2B-2C illustrate examples of septic tank systems that include a septic tank 10. As shown in FIG. 2B, septic tanks 10 are often positioned underground. With regard to FIG. 2C, the septic tank 10 defines a chamber 14 and has an access opening 18 for accessing an interior of the chamber 14 during routine maintenance and waste removal. In one example (FIG. 1), the septic tank 10 has a single access opening 18, and in another example (FIG. 2A), the septic tank 10 has more than one (e.g., two) access openings 18.

With respect to FIGS. 2B and 2C, an access port 30, which are commonly referred to as tank risers or risers (the terms 'access port' and 'riser' may be used interchangeably), are installed on the access openings 18 to the chambers 14 of the septic tank 10 to perform maintenance on septic tanks 10. Each riser 30 is an assembly of components. In the embodiment of FIGS. 2C-3B, the riser 30 includes a tank connector 34 (e.g., a septic tank adapter), a pipe 38 (e.g., a pipe segment) that is coupled to the tank connector 34, an ingress device 46 (e.g., an ingress barrier) that is coupled to the tank connector 34, a lid 50 that is coupled to the pipe 38, and one or more seals 54. The lid 50 is removably coupled to the pipe 38 via fasteners (not shown). In some embodiments, as shown in FIG. 1, the risers 30 can be positioned on existing risers 60, which are already installed on the access openings 18 to the chamber 14. While the invention herein is described in detail with regard to septic tanks, it will be appreciated that the invention may be incorporated or used with water tank systems, storage tank systems, sewer wet well systems, wastewater treatment tank systems, or other systems with a riser.

Figure 3A:
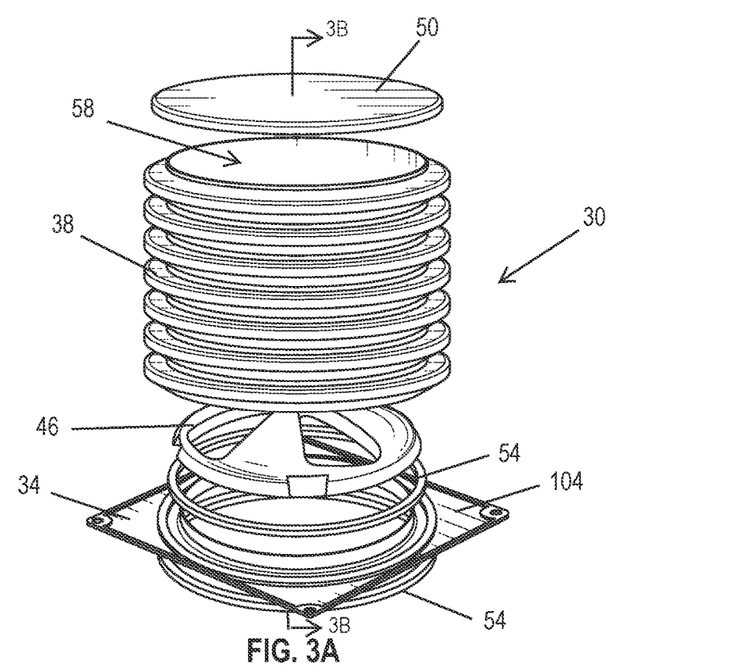
FIG. 3A is a perspective exploded view of the riser of FIG. 2A illustrating a connector and an ingress device.
Figure 3B:
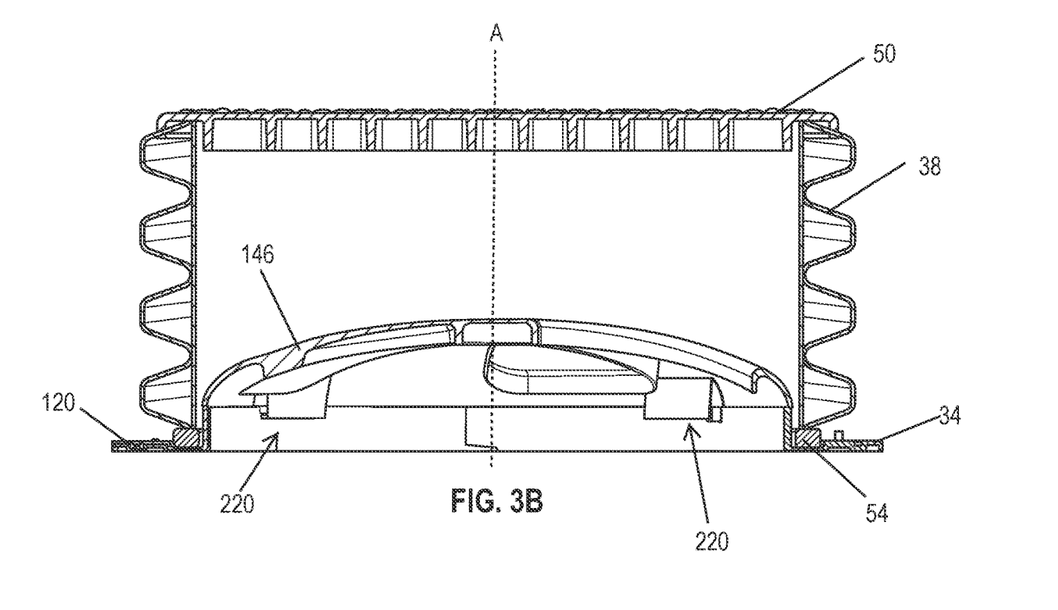
FIG. 3B is a cross-sectional view of the riser of FIG. 3A along the line 3B-3B of FIG. 3A.
Figure 4:
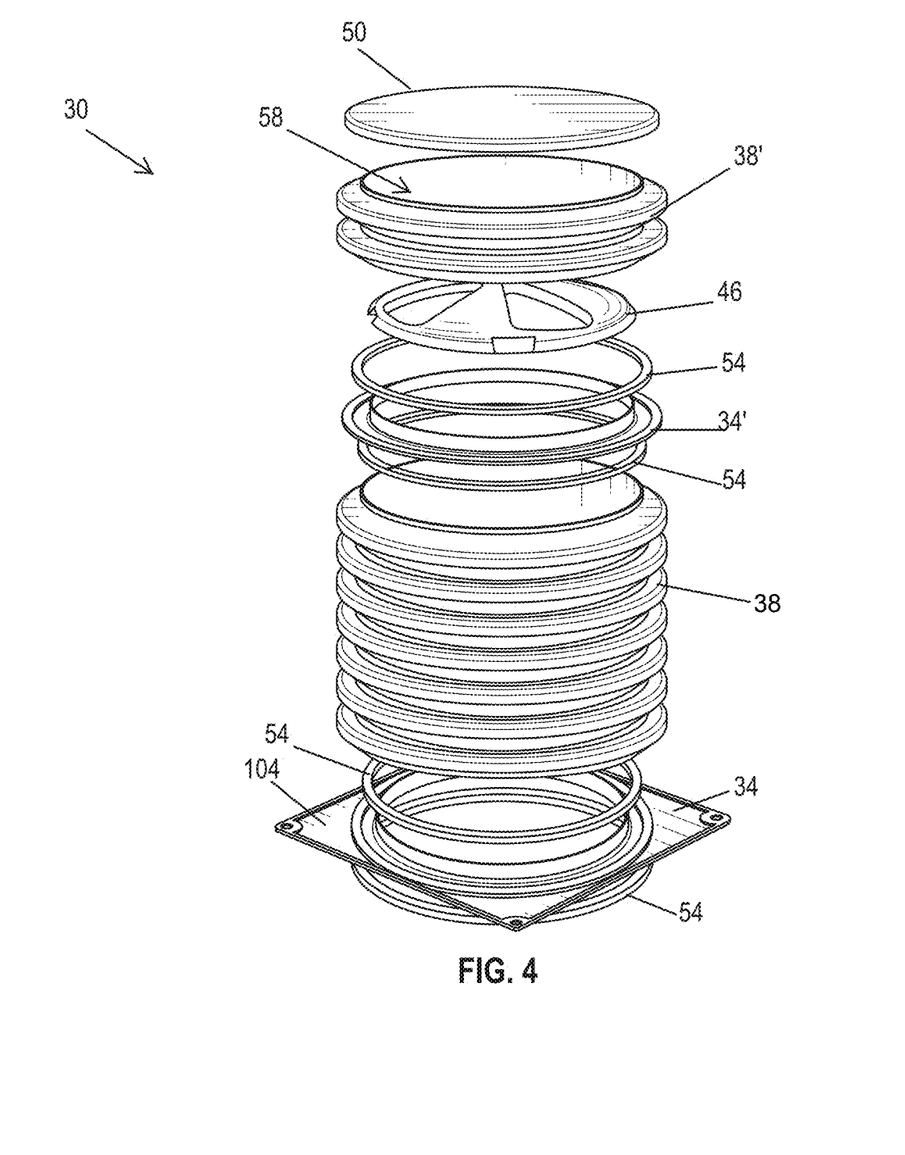
FIG. 4 is a perspective exploded view of a riser according to another embodiment including a connector and an ingress device.
Figure 5:
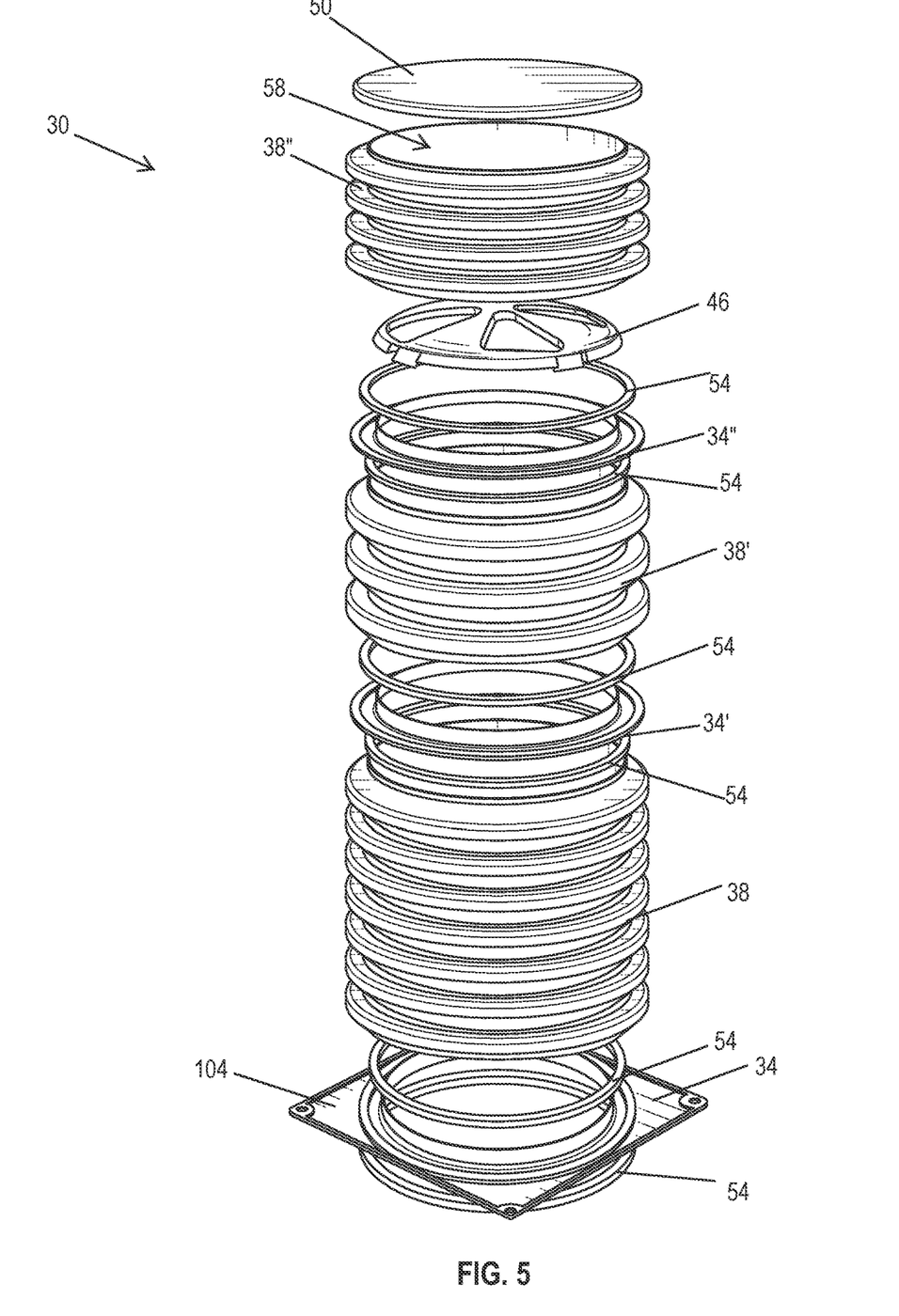
FIG. 5 is a perspective exploded view of a riser according to another embodiment including a connector and an ingress device.

With reference to FIGS. 3A, 4, and 5, the riser 30 is configured based on the height needed for the riser 30 and may include one or more connectors or adapter flanges 34, 34', 34'' and one or more pipes or pipe segments 38, 38', 38'''. It will be appreciated that the terms 'adapter flange' and 'connector' are used interchangeably in the Detailed Description and the Claims.

As shown in FIG. 4, the riser 30 includes a tank connector or adapter flange 34, a first pipe or first pipe segment 38 that is coupled to the tank connector 34, an intermediate connector or adapter flange 34' that is coupled to the first pipe segment 38, an ingress device 46 that is coupled to the intermediate connector 34', a second pipe or second pipe segment 38', a lid 50 that is coupled to the second pipe 38', and one or more seals 54. In another example, shown in FIG. 5, the riser 30 includes the tank connector 34, the first pipe or first pipe segment 38 that is coupled to the tank connector 34, a first intermediate connector 34' that is coupled to the first pipe 38, a second pipe or second pipe segment 38' that is coupled to the first intermediate connector 34', a second intermediate connector 34'' that is coupled to the second pipe 38', an ingress device 46 that is coupled to the second intermediate connector 34'', a third pipe or third pipe segment 38'' that is coupled to the second intermediate connector 34'', the ingress device or lid 46 that is coupled to the third pipe 38'', and one or more seals 54.

The tank connector 34 defines a first end of the riser 30 and the lid 50 defines a second end. Accordingly, a height of the riser 30 is defined between the tank connector 34 where the riser is coupled to the tank 10 at the first end and the lid 50 at the second end. The invention embodied herein contemplates different heights for the riser 30 to accommodate the height between the tank 10 and a surface of the ground where users and maintenance professionals access the tank 10. As shown in FIGS. 4 and 5, different combinations of the components may be used to achieve the necessary height. In some constructions, each intermediate connector/pipe pair may be considered an extender assembly, which can be used to extend the height of a riser 30 already in the field. In these circumstances, an ingress device 46 may be included (e.g., adjacent the ground). As shown in each of the embodiments, the ingress device is positioned within a central opening 58 defined by the riser 30 and at least partially covers the access opening 18. In some embodiments, a second or secondary ingress device 46 may be included in the riser assembly.

The ingress device 46 is positioned at a location between the first end and the second end of the riser 30. The position of the ingress device 46 in the riser 30 makes it more difficult to tamper with. The access opening 18 of the septic tank 10 can vary in size and shape. In some cases, the access opening 18 is large enough to allow human ingress. The ingress device 46 helps to prevent users or maintenance personnel from accidentally falling into the septic tank 10 while still allowing access for cleaning, pumping, and other maintenance equipment. The ingress device 46 is designed to resist tampering so that the structure of the riser 30 is not damaged or otherwise adversely impacted, and to maintain safety for those who are accessing the tank 10 or the riser 30 (e.g., for maintenance). The ingress device 46 is therefore placed at a location in the riser 30 that is spaced far enough from the second end of the riser 30 to prevent tampering and manipulation of the ingress device 46, yet the ingress device 46 is still located close enough to the second end to provide access to the tank 10 and the riser 30, and to be removable if desired.

The seal 54 is positioned between the septic tank and the tank connector 34 to create a watertight seal, and another seal 54 may be positioned between the tank connector 34 and the pipe 38 connected thereto to create another watertight seal. Additionally, the tank connector 34 may be secured to the septic tank 10 via any suitable means (e.g., adhesive, caulk, concrete, or fasteners). Similarly, a seal 54 is positioned between each intermediate connector 34', 34'' and the respective pipe 38, 38' and a seal 54 is positioned between each intermediate connector 34', 34'' and the respective pipe 38', 38''. The seals 54 provide watertight connections between the intermediate connectors 34', 34'' and the respective adjacent pipes 38, 38', 38'' coupled thereto. In some embodiments, the seals 54 may be formed from butyl tape.

The tank connector 34 of FIGS. 2C-3D and the first and second intermediate connectors 34', 34'' of FIGS. 4-10 have substantially the same configuration, except as otherwise discussed. Therefore, the following discussion of the "connector" applies to the connectors 34 and the first and second intermediate connectors 34', 34'' alike. The differences between the tank connector 34 and the first and second intermediate connectors 34', 34'' will be explained in detail.

Figure 3C:
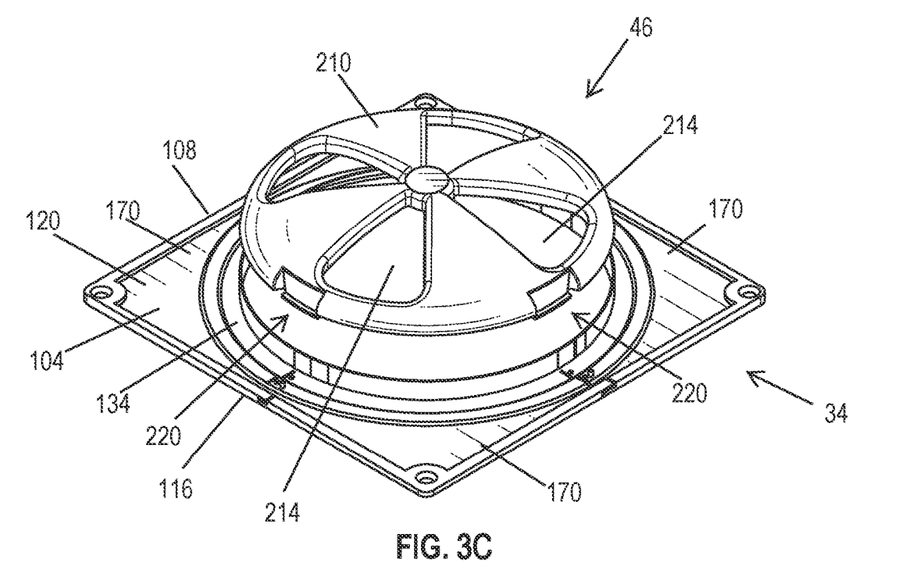
FIG. 3C is a perspective view of the connector and the ingress device of FIG. 3A.
Figure 3D:
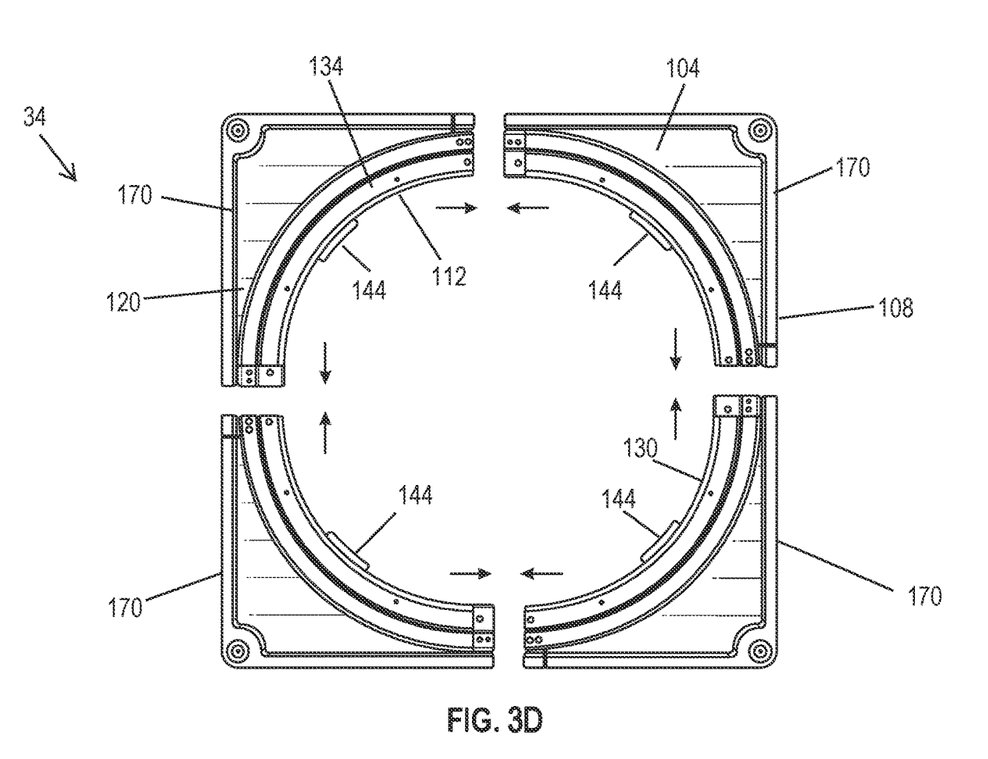
FIG. 3D is a top view of the connector of FIG. 3A.
Figure 6:
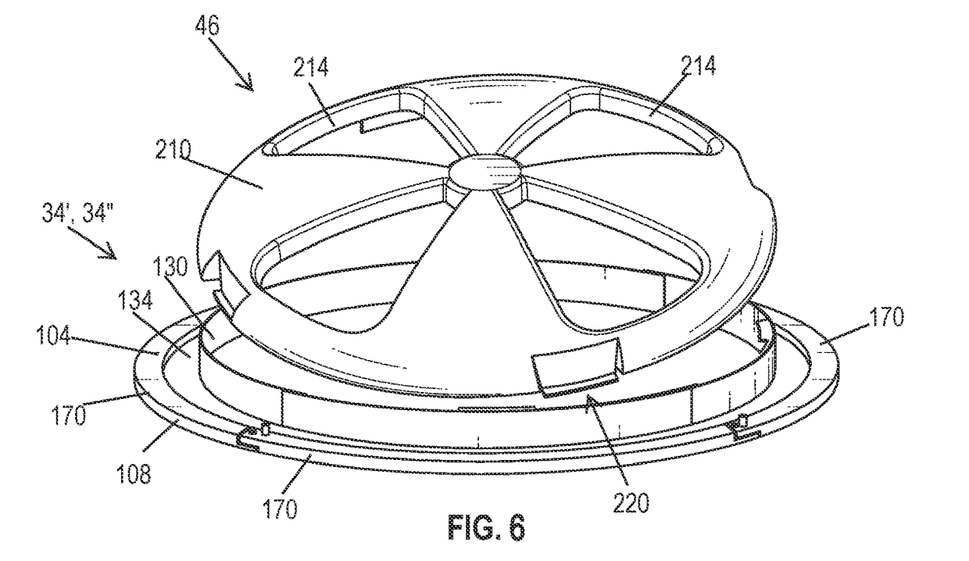
FIG. 6 is a perspective view of the connector and the ingress device of FIGS. 1, 4, and 5.
Figure 7:
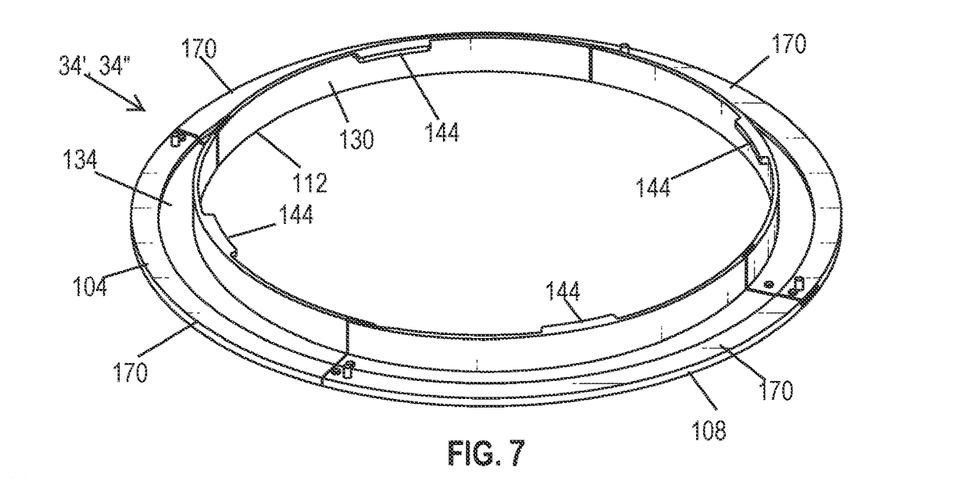
FIG. 7 is perspective view of one of the connectors and the ingress device of FIGS. 1, 4, and 5.
Figure 8:
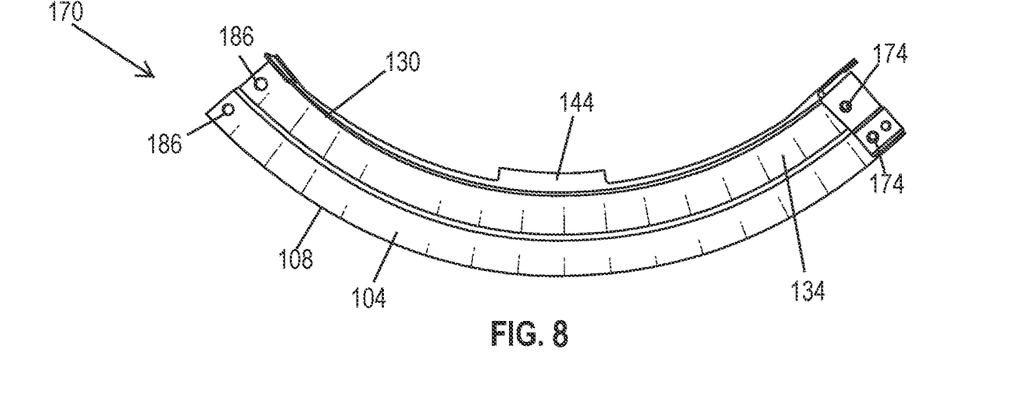
FIG. 8 is a top view of a section one of the connectors of FIGS. 1, 4, and 5.

With reference to FIGS. 3A-3D and 6-8, the connector 34, 34', 34'' includes a flange body 104 that defines an outer perimeter 108 and an inner bore 112 that has an axis A. The flange body 104 includes a first surface 116 and a second surface 120 that is opposite the first surface 116. As shown in FIGS. 3C and 3D, in some embodiments, the flange body 104 is square and enlarged in comparison to the circular and smaller flange body 104 of the first and second intermediate connectors 34', 34", which are shown in FIGS. 6-8. However, the first and second intermediate connectors 34', 34" also may be used as tank connectors, albeit with smaller flanges 104, as shown in FIG. 1. The flange body 104 of the tank connector 34 is configured to be coupled to the septic tank 10 to support and couple the riser 30 relative to the septic tank 10 adjacent to and surrounding the access opening 18. The flange body 104 of the tank connector 34 advantageously defines a large outer perimeter 108 and a large area between the outer perimeter 108 and the inner bore 112. The large outer perimeter 108 and area of the flange body 104 of the tank connector 34 allows the connector 34 to be attached to septic tanks 10 that have access openings 18 that have a variety of shapes and sizes, which contrasts conventional riser 30 that have adapter rings that are round and only slightly larger than the riser pipe diameter. The inner bore 112 is configured to align with the access opening.

Figure 11A:
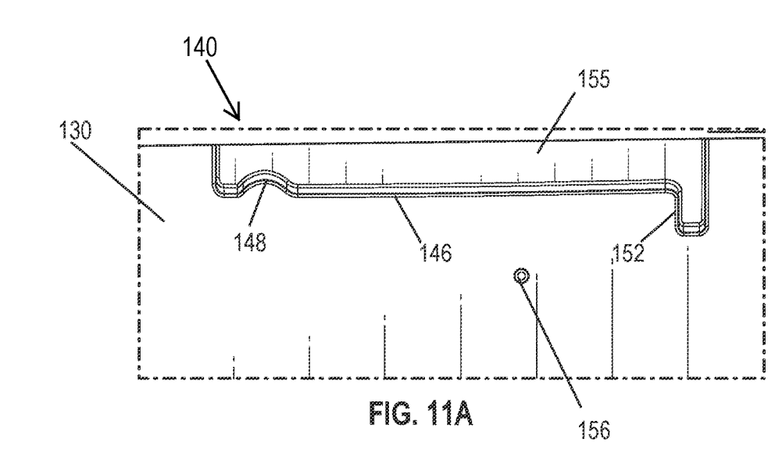
FIG. 11A is a detailed view of a portion of the connectors of FIGS. 1, 3A, 4, and 5.
Figure 11B:
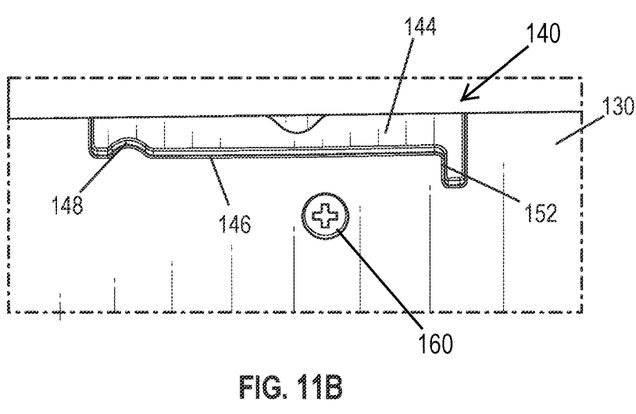
FIG. 11B is a detailed view of a portion of the connectors of FIGS. 1, 3A, 4, and 5.

With reference to FIGS. 3C-3D and 6-8, the flange body 104 also includes a lip 130 that extends from the second surface 120 of the flange body 104 about the inner bore 112. A groove or channel 134 is defined in the second surface 120 of the flange body 104 and surrounds the lip 130. The groove 134 is configured to locate and receive the respective seal 54. With reference to FIG. 7, a plurality of coupling members 140 extend from an inner surface of the lip 130. In the illustrated embodiment, the plurality of coupling members 140 are similar to threaded members. With reference to FIGS. 11A and 11B, in the illustrated embodiment, each of the plurality of coupling members 140 is a projection 144 that extends radially inward from the inner surface of the lip 130. The projection 144 has a thickness and defines a surface 146. The projection 144 further includes a recess 148 at a first end of the projection 144 and a stop 152 at a second end of the projection 144 that is opposite the first end. In some constructions, the projection 144 tapers such that the thickness increases in a circumferential direction of the lip 131450 from adjacent the recess 148 toward the stop 152. In other constructions, the thickness of the projection 144 is constant or substantially constant. One or more dimples 156 may be disposed in the inner surface of the lip 130, which may be located generally below each of the plurality of coupling members 140. The dimples 158 demarcate where a user should insert a threaded fastener 160 to couple the connector 34, 34', 34" to the respective pipe 38, 38', 38".

As shown in FIGS. 3D, 7, and 8, the connector 34, 34', 34" is formed of a plurality of sections 170 that are removably coupled to one another. Each of the plurality of sections 170 is identical to the other sections 170 and cooperatively define the flange body 104 and the inner bore 112. That is, each of the plurality of sections 170 defines a portion of the flange body 104, a portion of the outer perimeter 108, a portion of the inner bore 112, and a portion of the lip 130. Each of the plurality of sections 170 also includes one of the coupling members 140 and one of the plurality of dimples 158.

Figure 9A:
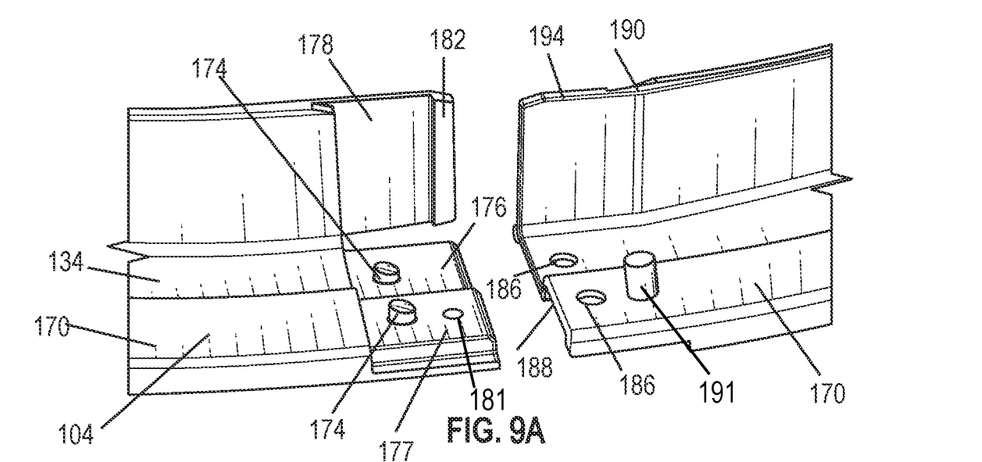
FIG. 9A is a detailed exploded view of a first section and a second section of the connectors of FIGS. 1, 3A, 4, and 5 having one configuration.
Figure 9B:
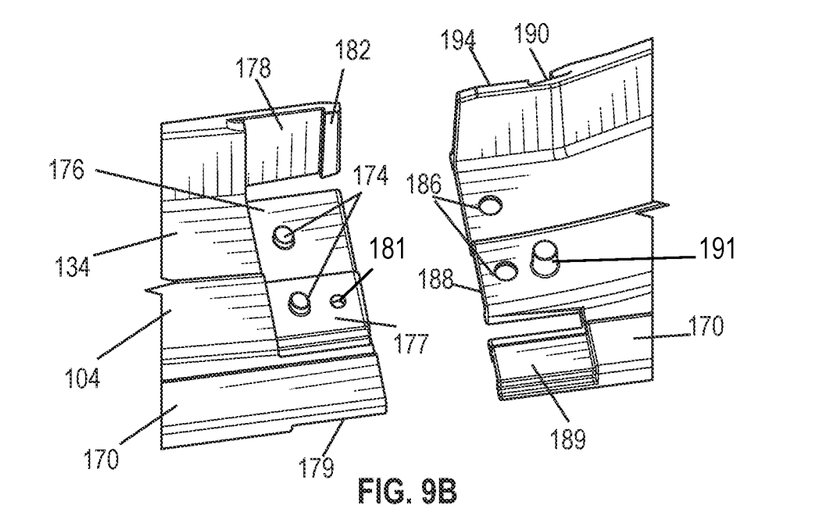
FIG. 9B is a detailed exploded view of a first section and a second section of the connectors of FIGS. 1, 3A, 4, and 5 having another configuration.
Figure 10:
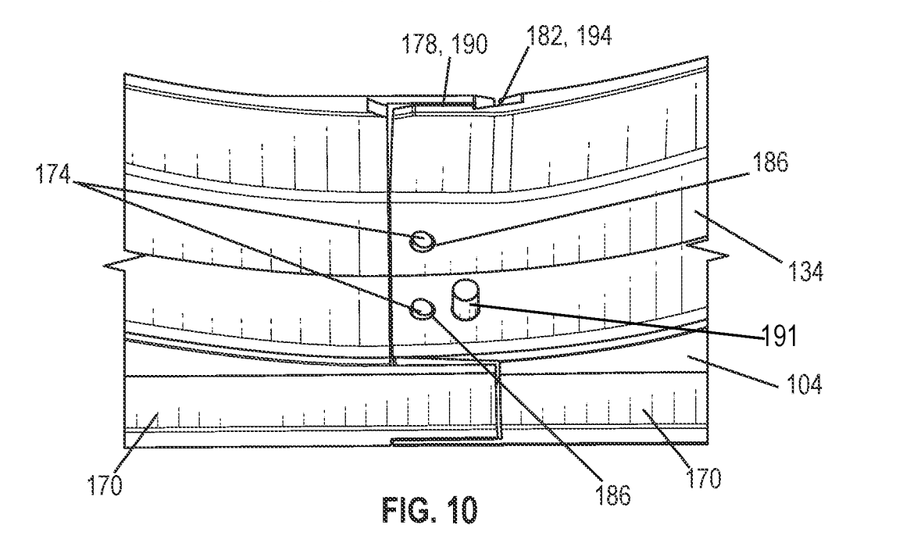
FIG. 10 is a detailed view of a first section and a second section of FIG. 9A of the connectors of FIGS. 1, 3A, 4, and 5.

As shown in FIGS. 3D and 7-10, each of the plurality of sections 170 includes a first end and a second end opposite the first end. As shown in FIG. 9, the first end of each of the plurality of sections 170 is coupled to the second end of the adjacent section 170. The first end of each of the plurality of sections 170 is coupled to the second end of an adjacent section 170 via two positive engagement mechanisms (e.g., interlock mechanisms), with one engagement mechanism defined by a protrusion/aperture engagement and another of the engagement mechanisms defined by corresponding features such as a tooth/recess engagement that cooperatively define a snap-fit engagement. In the illustrated embodiment, the sections 170 are coupled together without the use of threaded fasteners.

Each of the first ends has one or more protrusions 174 (e.g., male interlock features) each extending from the second surface 120 of the portion of the flange body 104 along an axis that is generally parallel to the axis A. As shown in FIG. 9A, the first ends each include a recessed portion 176 and a tongue 177. One of the protrusions 174 extends from the recessed portion 176 and one of the protrusions 174 extends from the tongue 177. In some embodiments, such as that of FIG. 9B, the first end may further include a channel 179 in the second surface of the flange body 104. With respect to both FIGS. 9A and 9B, the first end may include an aperture 181 extending through the tongue 177. In addition, and as shown in FIG. 9A, the first end includes a recess 178 in an outer surface of the portion of the lip 130 that creates a protrusion or a tooth 182. The recess 178 and the protrusion 182 define an interlock feature. Each of the second ends includes one or more apertures 186 (e.g., female interlock feature) extending through the second surface 120 of the flange body 104. The quantity of apertures 186 in the second end correspond to the quantity of protrusions 174 of the first end (e.g., two each), although there may be any quantity of protrusions 174 and apertures 186. In the embodiment of FIG. 9B, the second end may further include a tongue 189. With respect to both FIGS. 9A and 9B, the second end may include a post 191 extending from the second surface 120. The second end also includes a channel 188 in the first surface 116, and one of the apertures 186 extends through the channel 188. Each of the second ends further includes a recess 190 in the inner surface of the portion of the lip 130 that defines a projection or tooth 194. The recess 190 and projection 194 define another interlock feature.

The first end of each of the plurality of sections 170 is removably couplable to the second end of an adjacent section 170. That is, the protrusions 174 of the flange body 104 of the first end are configured to be received in respective apertures 186 of the flange body 104 of the second end. The recessed portion 176 is configured to receive a portion of the second end and the tongue 177 is configured to be received in the channel 188 such that the sections 170 are flush relative to one another. Similarly, in the embodiment of FIG. 9B, the tongue 189 is configured to be received in the channel 179. Also, the tooth 182 of the portion of the lip 130 of the first end is received in the recess 190 of the portion of the lip 130 of the second end, while the recess 178 of the portion of the lip 130 of the first end receives the projection 194 of the lip 130 of the second end. The aperture 181 is configured to be positioned beneath a location of the post 191. Accordingly, in some instances, a threaded fastener (not shown) may optionally be inserted through the aperture 181 and threadably coupled in the post 191. Because the fasteners are inserted from the bottom of the flange 104 and hidden by the post 191 they are less visible and less likely to be tampered with.

Figure 12A:
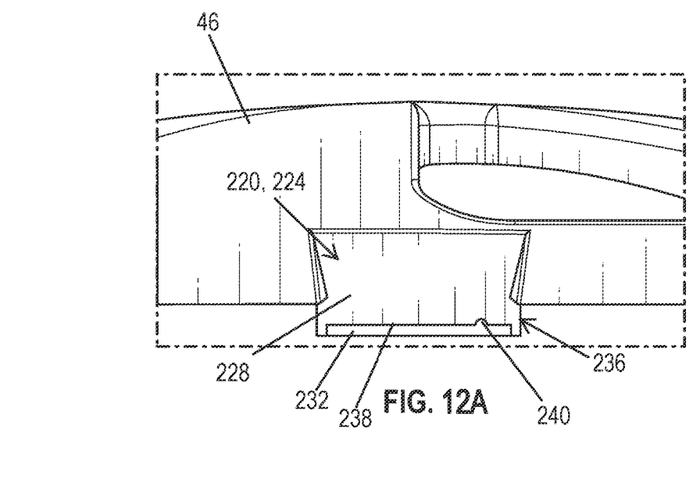
FIG. 12A is a side view of the ingress device of FIGS. 1, 3A, 4, and 5.
Figure 12B:
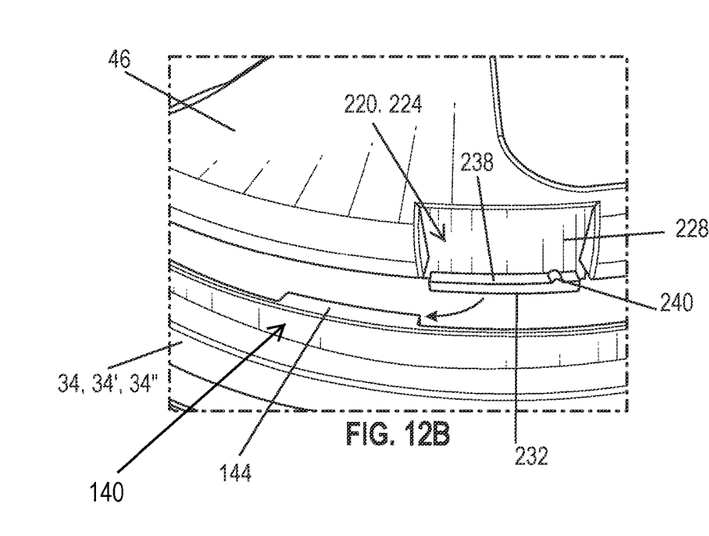
FIG. 12B is a detailed perspective view of the ingress device FIGS. 1, 3A, 4, and 5.

The ingress device 46 is configured be coupled to any of the connector 34, 34', 34" depending on the height of the riser 30. With reference to FIGS. 3C, 12A, and 12B, the illustrated ingress device 46 includes a body 210 that has four apertures 214. The body 210 in the illustrated embodiment is substantially semi-circular (e.g., dome-shaped) and the apertures 214 are positioned at regular radial intervals.

The apertures 214 are configured to allow visibility of the chamber 14 and the access opening 18 and may also permit fluid communication between the chamber 14 of the septic tank 10 and an area outside of the riser 30. In other embodiments, the ingress device 46 may have fewer than four apertures 214 or more than four apertures 214, as long as they are adequately sized to permit visibility and/or equipment to pass therethrough. The ingress device 46 includes a plurality of coupling members 220 that are configured to mate with respective coupling members 140 of the connector 34, 34', 34". In the illustrated embodiment, the coupling members 140 of the connector 34, 34', 34" and the coupling members 140 are complementary and define a threaded connection between the ingress device 46 and the connector 34, 34', 34". That is, the respective coupling members define threaded members such that the ingress device 46 and the respective connector 34, 34', 34" can be threadably coupled together. As shown, each of the coupling members 220 of the ingress device 46 defines a clip that has a substantially L-shaped flange 224 extending from a perimeter of the body 210. More specifically, a first leg 228 of the flange 224 is resiliently coupled to the ingress device 46 and extends from the body 210, and a second leg or projection 232 of the flange 224 extends from the first leg 228, and a channel 236 is created between the perimeter of the body 210 and the projection 232 to facilitate the resilient connection.

The projection 232 has a thickness and defines a surface 238, and includes a detent 240. The projection 232 is engageable with the projection 144 on the flange body 104 to secure the ingress device 46 to the connector 34, 34', 34". In some constructions, the projection 232 tapers such that the thickness increases in a circumferential direction toward the detent 240. In other constructions, the thickness of the projection 232 is constant or substantially constant. In either construction, the projection 232 is engageable with the projection 144 in a thread-like fashion.

To couple the ingress device 46 to the respective connector 34, 34', 34", the body 210 of the ingress device 46 is positioned within the inner bore 112 of the connector 34, 34', 34" such that the projections 232 of the body 210 are radially and axially offset relative to the projections 144 of the inner surface of the connector 34, 34', 34". More specifically, the projections 232 of the ingress device 46 are positioned such that the second end is positioned adjacent the first end of the respective projection 144 of the connector 34, 34', 34". Then, the ingress device 46 is rotated in a first direction (e.g., clockwise) relative to the connector 34, 34', 34" about the axis A such that the tapered surfaces of the projections 144, 232 of the ingress device 46 and the connector 34, 34', 34" increasingly engage one another thereby acting similarly to a threaded connection. The projections 144, 232 move relative to one another until the second end of the projections 232 of the ingress device 46 engage the respective stop 152 and the detent 240 is received in the respective recess 148, at which point each of the projections 144, 232 of the connector 34, 34', 34" is received by and seated in the respective channel 236 of the ingress device 46. To remove the ingress device 46, the ingress devices 46 is rotated in a direction opposite the first direction (e.g., counterclockwise) to remove the projections 144 of the connector 34, 34', 34" from the respective channels 236 of the ingress device 46.

To assemble the riser 30, the tank connector 34 is positioned on the septic tank 10 adjacent to and surrounding the access opening 18 with the respective seal 54 positioned between the septic tank 10 and the tank connector 34 in the groove 134. The pipe (e.g., the first pipe 38) is positioned relative to the tank connector 34 such that the lip 130 is positioned within the pipe 38. The pipe 38 and the tank connector 34 are coupled via a plurality of threaded fasteners 160, one located at each dimple 156. The ingress device 46 is then coupled to the tank connector 34 as described above. In the embodiment of FIGS. 2B-3B, the lid 50 is coupled to the pipe.

In the embodiments of FIGS. 4 and 5, the additional pipes 38', 38" and connectors 34', 34" (extender assemblies) are coupled thereto in the same manner as discussed above to extend the height of the riser 30.

The connectors 34, 34', 34" and the ingress device 46 may be fabricated from polymer material, sheet metal, steel reinforced concrete or any other materials as required to fit the size of the riser 30 on the septic tank 10. The ingress device 46 can be manufactured as an integral part of the connector 34, 34', 34" with a secondary operation to trim the ingress device 46 from the connector 34, 34', 34" to create two parts. Alternatively, the connector 34, 34', 34" and the ingress device 46 can be molded as a single piece or as multiple segments that are assembled together.

Although specific examples of positive engagement mechanisms for coupling the section 170 of the connector 34, 34', 34" are shown and described herein, the section 170 may be assembled together using any suitable means, such as, mechanical fasteners, adhesives, welding or any combination thereof.

Moreover, while the coupling members 140, 220 of the connector 34, 34', 34" and the ingress device 46 are shown as specific examples, the connector 34, 34', 34" and the ingress device 46 can be removably coupled (e.g., by authorized personnel) to one another using any suitable means, such as hidden mechanical fasteners, molded tabs, threads, snap features, etc.

Although the invention has been described in detail with reference to certain preferred embodiments, variations and modifications exist within the scope and spirit of one or more independent aspects of the invention as described.

Various features and advantages of the invention are set forth in the following claims.

The invention claimed is:

1. An ingress device assembly configured to be used with a septic tank that has a chamber and an access opening and a riser having a pipe segment extending from the chamber, the ingress device assembly comprising:
   a connector configured to couple the riser over the access opening and including a flange having a first section with a first interlock feature and a second section with a second interlock feature engaged with the first interlock feature such that the first section and the second section cooperatively define a perimeter of the connector and an inner bore configured to align with the access opening; and
   an ingress device removably and rotatably coupled to the connector at the inner bore, the ingress device including a body configured to extend across at least a portion of the access opening,
   wherein the connector includes a projection and the ingress device includes a clip engageable with the projection as the ingress device rotates relative to the connector.

2. The ingress device assembly of claim 1, wherein the ingress device includes a first coupling member having the clip and the connector includes a second coupling member having the projection, and wherein the first coupling member and the second coupling member are threadably coupled together.

3. The ingress device assembly of claim 2, wherein the projection is a first projection that is coupled to the first section and the connector includes another second coupling member having a second projection that is coupled to the second section.

4. The ingress device assembly of claim 1, wherein the projection is a first projection extending from an inner surface of the flange and the first projection defines a recess and a stop, and wherein the ingress device includes a second projection extending from the body and having a detent engageable with the recess to secure the ingress device to the connector.

5. The ingress device assembly of claim 1, wherein the first interlock feature and the second interlock feature engage one another in a snap-fit engagement.

6. The ingress assembly of claim 1, wherein the flange defines a channel along the perimeter, and wherein the channel is configured to receive a seal.

7. The ingress assembly of claim 1, wherein the first section includes two first sections and the second section includes two second sections, wherein the two first sections are connected together by a third interlock feature and the two second sections are connected together by a fourth interlock feature.

8. The ingress assembly of claim 1, wherein a first surface of the flange is configured to be coupled to a first riser pipe and a second surface of the flange is configured to be coupled to a second riser pipe.

9. An ingress device assembly configured to be used with a septic tank that has a chamber and an access opening and a riser having a pipe segment extending from the chamber, the ingress device assembly comprising:
a connector configured to couple the riser over the access opening and including a flange having a first section with a first interlock feature and a second section with a second interlock feature engaged with the first interlock feature such that the first section and the second section cooperatively define a perimeter of the connector and an inner bore configured to align with the access opening; and
an ingress device removably and rotatably coupled to the connector at the inner bore, the ingress device including a body configured to extend across at least a portion of the access opening,
wherein the connector includes a first projection extending from an inner surface of the flange and the first projection defines a recess and a stop, and
wherein the ingress device includes a second projection extending from the body and having a detent engageable with the recess to secure the ingress device to the connector.

10. The ingress device assembly of claim 1, wherein the ingress device includes a first coupling member and the connector includes a second coupling member having the first projection, and wherein the first coupling member and the second coupling member are threadably coupled together.

11. The ingress device assembly of claim 10, wherein the first projection is coupled to the first section and the connector includes another second coupling member having a third projection that is coupled to the second section.

12. The ingress device assembly of claim 9, wherein the first interlock feature and the second interlock feature engage one another in a snap-fit engagement.

13. The ingress assembly of claim 9, wherein the flange defines a channel along the perimeter, and wherein the channel is configured to receive a seal.

14. The ingress assembly of claim 9, wherein the first section includes two first sections and the second section includes two second sections, wherein the two first sections are connected together by a third interlock feature and the two second sections are connected together by a fourth interlock feature.

15. The ingress assembly of claim 9, wherein a first surface of the flange is configured to be coupled to a first riser pipe and a second surface of the flange is configured to be coupled to a second riser pipe.

* * * * *